United States Patent

Rogers et al.

[11] 4,296,983
[45] Oct. 27, 1981

[54] EDGE JOINT FOR SHEETS

[75] Inventors: Stanley J. C. Rogers, Gravesend; John F. Taplin, Thornton Heath, both of England

[73] Assignee: Vickers Limited, London, England

[21] Appl. No.: 70,714

[22] Filed: Aug. 29, 1979

[30] Foreign Application Priority Data

Aug. 31, 1978 [GB] United Kingdom ............... 35230/78

[51] Int. Cl.³ .............................................. A47B 47/02
[52] U.S. Cl. ............................... 312/263; 312/252 SM
[58] Field of Search ............ 52/588, 579; 312/257 R, 312/257 SK, 257 SM, 263, 100, 140, 264

[56] References Cited

U.S. PATENT DOCUMENTS

| 4,073,110 | 2/1978 | Kennedy | 52/588 X |
| 4,192,117 | 3/1980 | Heirich | 52/588 X |
| 4,192,119 | 3/1980 | Murphy | 52/588 |

FOREIGN PATENT DOCUMENTS

| 539549 | 7/1955 | Belgium | 52/588 |
| 2258153 | 8/1975 | France | 312/257 R |
| 76073 | 12/1949 | Norway | 312/257 R |
| 620754 | 3/1949 | United Kingdom . | |
| 925756 | 5/1959 | United Kingdom | 312/257 R |
| 1162774 | 6/1968 | United Kingdom | 312/263 |

Primary Examiner—James T. McCall
Attorney, Agent, or Firm—Shoemaker and Mattare, Ltd.

[57] ABSTRACT

Adjoining edges of sheets of pre-coated metal or other rigid material may be interlocked against movement transversely apart by forming the edge of a first sheet with a lock member constituted by a transversely offset reverse flange having at its extremity an outwardly directed first hook member and forming the adjoining edge of the second sheet with a transversely offset projecting flange whose extremity forms a second hook member directed inwardly. The sheets may be locked together by superposing the second hook member over the first hook member with the projecting flange behind the reverse flange and with orthogonal flanges spaced slightly apart and relatively rotating the sheets to a fully interlocked position defined by abutment between the orthogonal flanges. The above arrangement can advantageously be used in the vertical rear corner joints of a pre-coated steel cabinet where it is helpful to be able to assemble the cabinet from its major components without the need for pop-riveting or the like.

11 Claims, 3 Drawing Figures

EDGE JOINT FOR SHEETS

FIELD OF THE INVENTION

The present invention relates to a joint between adjoining linear edges of sheets of thin rigid material which is typically a metal such as pre-painted or plastics coated steel.

SUMMARY OF THE INVENTION

Broadly stated, the invention provides first and second sheets having adjoining linear edges arranged for locking against movement transversely apart, the edge of the first sheet having a transversely offset first reverse flange whose extremity forms a first hook member directed away from the face of the first sheet, the edge of the second sheet having a transversely offset projecting flange whose extremity forms a second hook member directed towards the face of the second sheet, the sheets being interlockable by superposing the second hook member over the first hook member with the projecting flange behind the reverse flange and with the edges spaced slightly apart and relatively rotating the sheets to a fully interlocked position defined by abutment of their edges.

In another aspect, the invention provides a cabinet in which the first sheet constitutes the back panel and the second sheet constitutes a side panel so that a back vertical corner of the cabinet is constituted by mechanically interlocking members which when locked together can stand upright during assembly of the cabinet without fixing by means of screws or rivets.

BRIEF DESCRIPTION OF THE DRAWINGS

Other preferred aspects of the invention are defined in the appended claims to which attention is hereby directed.

An embodiment of the invention will now be described, by way of example only, with reference to the accompanying drawings, in which.

DESCRIPTION OF THE PREFERRED EMBODIMENT

Figure 1:
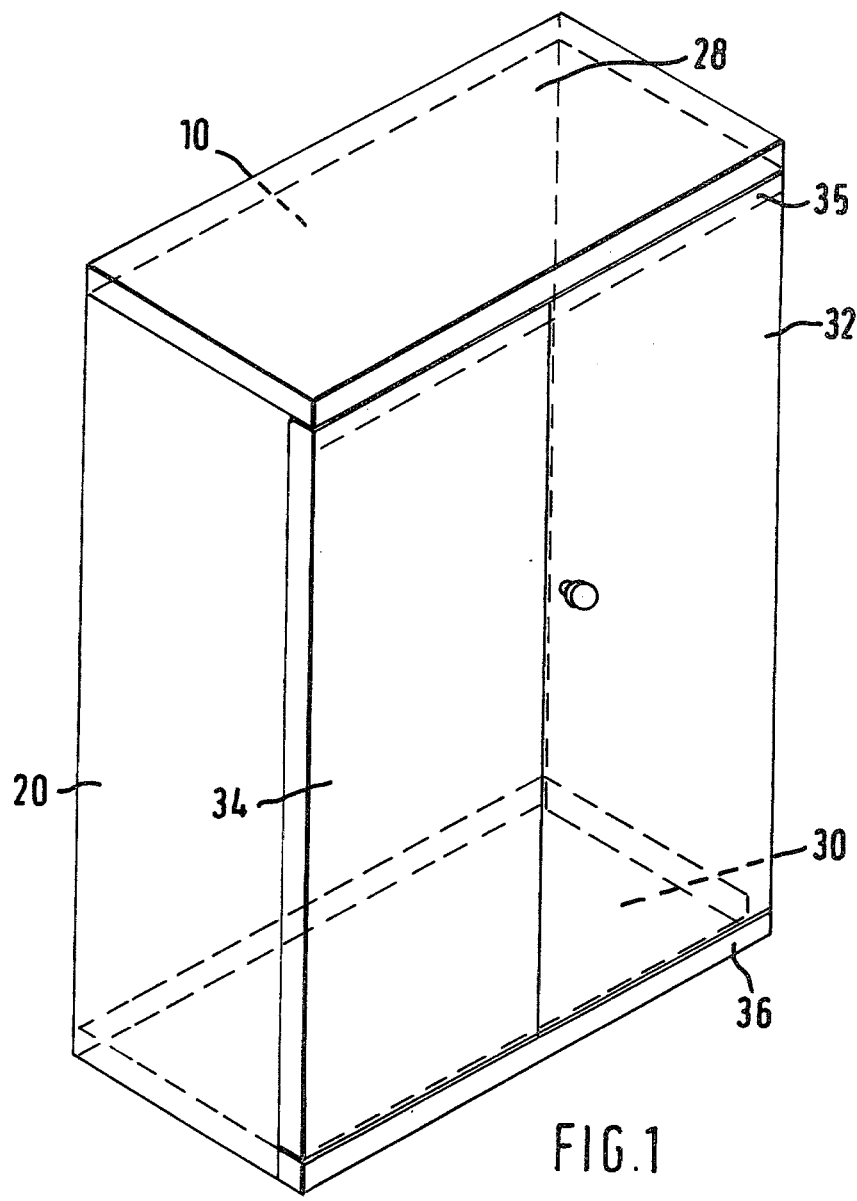
FIG. 1 is a view in isometric projection of a pre-coated sheet steel cabinet showing the front, top panel and one side panel.

In FIG. 1 a pre-coated sheet steel cabinet has a top panel 28, a back panel 10, side panels 20, a base 30 and doors 32 and 34 hinged to the front of the cabinet and provided with locking bars (not shown) engaging sockets in a front cross-member 35 and in an internal plinth 36 secured on the base 30.

Figure 2:
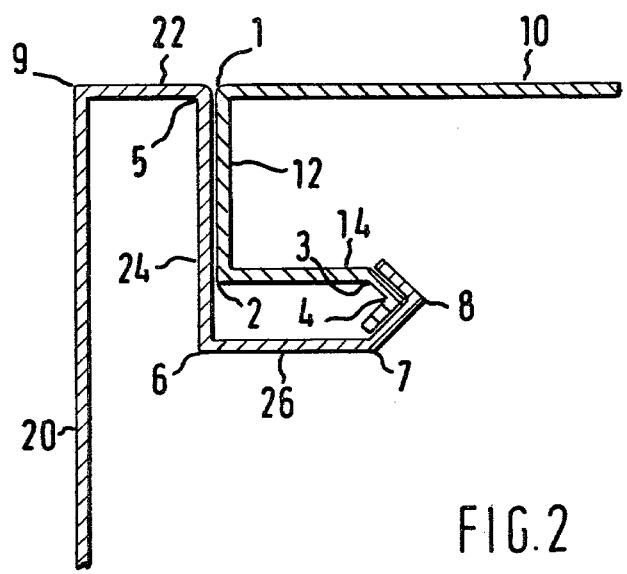
FIG. 2 is a horizontal section of the seam joining a side panel to the back panel according to a first embodiment of the invention.

Referring to FIG. 2, the seam joint therein described is believed to be of wider application than for metal cabinets of the kind shown in FIG. 1 and will be described in general terms. A first pre-coated steel sheet 10 of light gauge and forming a back panel of a pre-coated sheet metal cabinet has a rear corner edge formed with an orthogonal flange 12 and a reversely extending locking member. The orthogonal flange 12 is defined by a right-angled fold 1, extends normally to the major plane of the sheet, and its extremity is formed with a right-angled fold 2 in the same angular direction as the fold 1 to form a reverse flange 14. At the extremity of the reverse flange 14 is formed an acute-angled fold 3 in the opposite angular direction to the fold 2 and there is also formed an adjacent right-angled fold 4 in the same angular direction as the fold 3. The folds 3 and 4 together define two planar faces of a hook member directed away from the major face of the sheet 10.

The second steel sheet has a major face 20 forming the side panel of the metal cabinet formed with a right-angled fold 9 adjacent a corner edge to define a minor face 22. Extending from the face 22 is a clip member. A fold 5 in the same angular direction as the fold 9 defines a second orthogonal flange 24 extending from the extremity of the face 22 in spaced parallel relationship to the major face of the sheet 20 and of depth equal to the sum of the depths of the first orthogonal flange 12 and the first hook member. At the extremity of the orthogonal flange 24 is a right-angled fold 6 defining a clip flange 26 projecting normally away from the major face 20 of the second sheet and having at its extremity successive folds 7 and 8 in the same angular direction as that of the fold 6, the fold 7 being an acute-angle fold typically 45 degrees, and the fold 8 being a right angle fold. The folds 7 and 8 together define two planar faces of a second hook member which may be superposed in mating relationship on the first hook member.

The procedure for locking together the first and second sheets is as follows. The first sheet 10 is directed approximately at right angles to the major face 20 of the second sheet but with the orthogonal flange 24 spaced slightly from the orthogonal flange 12. With the clip flange 26 suitably positioned behind the reverse flange 14 the first hook member is located within the second hook member, after which the first sheet 10 is rotated relative to the second sheet to move the orthogonal flanges 12, 24 together, the first hook member pivoting within the second hook member, until a fully locked position is reached in which the flanges 12, 24 abut and the sheet 10 is in its required direction normal to the face 20.

The folds on the edges of the first and second sheets may be formed in known manner e.g., on a folding press by suitably shaped punches and dies.

Various modifications may be made to the arrangement shown in FIG. 2 without departing from the invention, whose scope is defined in the appended claims. For example, the first and second hook members need not be angular as shown, but instead they could be rolled to an arcuate profile. Similarly, the orthogonal flange 12 could be replaced e.g., by a curved region of the sheet, its principal functions being to support the reverse flange 14 and first hook member in spaced relation to the sheet 10 and to provide location against an offset edge region of the second sheet so as to define the fully clamped or locked position of the two sheets. However, the use of folds defining a distinct orthogonal flange has functional advantages. If a load is applied to the interlocked sheets tending to rotate the sheet 10 clockwise as viewed in FIG. 2 relative to the sheet 20, the region of the flange 12 adjoining the fold 2 has to be moved through a zone of interference with the flange 24 before the flanges 12 and 24 are free to move apart. Such movement is possible because of the resilience of the two sheets, but the interference causes the edge of the first sheet to be a snap fit within the edge of the second sheet which assists in holding the two sheets together in approximately the required angular position relative to one another during subsequent further assembly.

One proposed use of the above described arrangements is to form the internal corner joints between the back and the sides of sheet metal cabinets of the kind shown in FIG. 1. The joints require no tools for their assembly so that the parts of the cabinet can be transported in their knocked down state and assembled on site. Metal cabinets have considerable bulk in relation to their weight, and a facility for transport in knocked-down state and simple on-site assembly brings significant economic advantages. Previous cabinet designs have employed sides assembled to the back by means of pop rivets between abutting flanges which is time consuming and which requires a pop-rivet gun to be available at the assembly site. The flanges 12, 14, 24, 26 and associated hook members provide internal columns of considerable strength adjacent the vertical rear corners of the cabinet making any framework at these points unnecessary. Furthermore, conventional pop-riveted joints in conventional cabinets are not secure against unauthorized entry because the pop rivets can be cut by sawing between the joined flanges after which access to the interior of the cabinet is possible. In the present design an intruder would have to cut through the clip flange 26 which would be a time consuming job rendered even more difficult by the close abutment between orthogonal flanges 12 and 24. A yet further advantage of the present arrangement is that the clip flange 26 can be punched with apertures disposed at regular intervals to accommodate shelf support clips.

Figure 3:
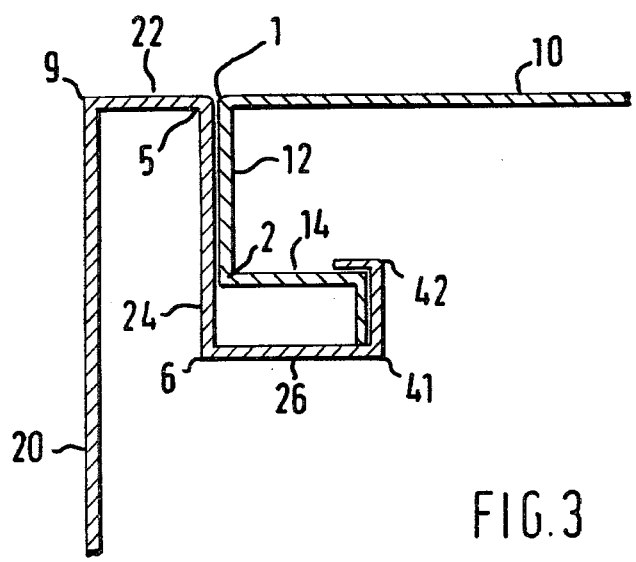
FIG. 3 is a horizontal section of the seam joining a side panel to the back panel according to a second embodiment of the invention.

FIG. 3 shows a simplified arrangement which is more convenient from a manufacturing standpoint and in which the first hook member is planar and is defined by a single right-angled fold 40, and the second hook member is defined by a pair of right angle folds 41 and 42. The procedure for locking the sheets 10 and 20 together is similar to that of the embodiment shown in FIG. 2.

We claim:

1. A locking means for joining a pair of sheets together to form a corner comprising:
   a first rigid planar portion connected at one end thereof directly to a first sheet of the pair of sheets to form a corner with that first sheet;
   a first rigid hook member including a second planar portion connected at one end thereof to another end of said first planar portion and extending in the direction of the first sheet and a hook forming portion connected to said second planar portion to open toward the first sheet;
   a second rigid hook member including a first planar segment connected at one end thereof directly to a first edge of the second sheet of the pair of sheets and extending away from that second hook, a hook forming segment connected to said first planar segment to open toward said first planar segment;
   said hook forming portion receiving said hook forming segment and interlocking the sheets together with said second sheet first edge being immediately adjacent said first planar portion another end to form a joint between the two sheets which is located at a location spaced from the corner a distance corresponding to the length of said first planar portion and in a manner such that said first planar portion is coplanar with the second sheet, the sheets being interlockable by superposing said first hook member over said second member with said second planar portion behind said first planar segment and with the edges thereof spaced slightly apart and relatively rotating the sheets to a fully interlocked position defined by abutment of such edges.

2. An arrangement according to claim 1, wherein the first sheet is folded in a region close to said first planar segment so that a major portion of the first sheet is directed at right angles to the major face of the second sheet and the first and second hook members are positioned within the 90 degree angulation.

3. An arrangement according to claim 2, wherein a first right-angled fold at the edge of the second sheet defines a first orthogonal flange at whose extremity a second right-angled fold in the same angular direction as the first fold defines the first planar segment.

4. An arrangement according to claim 3, wherein a third acute angled fold and a fourth right angled fold at the extremity of the first planar segment define respective planar faces of the second hook member, said third and fourth folds being in the opposite angular direction to the second fold.

5. An arrangement according to claim 4, wherein a fifth right-angled fold at the edge of the first sheet defines a second lateral flange which abuts the first orthogonal flange when the sheets are in the fully interlocked position, and a sixth right-angled fold in the opposite angular direction to the fifth right-angled fold defines the second planar portion.

6. An arrangement according to claim 5, wherein a seventh acute angled fold and an eighth right-angled fold at the extremity of the second planar portion define respective planar faces of the first hook member, said seventh and eighth folds being in the same angular direction as the sixth fold.

7. An arrangement according to claim 6, wherein a ninth fold closely spaced from the fifth fold in the opposite spatial direction to the sixth fold and in the same angular direction as the fifth fold defines a minor face of the first sheet adjoining the folded edge region thereof.

8. An arrangement according to claims 3, wherein a third right-angled fold at the extremity of the first planar segment defines the planar face of a second hook member.

9. An arrangement according to claim 8, wherein a seventh right-angled fold and an eighth right-angled fold at the extremity of the second planar portion define respective planar faces of the first hook member, the seventh and eighth folds being in the same angular direction as the sixth fold.

10. An arrangement according to claims 1, wherein the first and second sheets are of thin pre-painted or plastics coated steel.

11. An arrangement as claimed in claim 1, wherein the second sheet is a sheet metal back panel of a storage cabinet and the first sheet is a sheet metal side panel.

* * * * *